United States Patent
Kim et al.

(10) Patent No.: US 11,206,068 B2
(45) Date of Patent: *Dec. 21, 2021

(54) METHOD FOR REPORTING CHANNEL STATE INFORMATION IN WIRELESS COMMUNICATION SYSTEM SUPPORTING UNLICENSED BAND, AND APPARATUS FOR SUPPORTING SAME

(71) Applicant: LG ELECTRONICS INC., Seoul (KR)

(72) Inventors: Seonwook Kim, Seoul (KR); Joonkui Ahn, Seoul (KR); Suckchel Yang, Seoul (KR); Daesung Hwang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 168 days.

This patent is subject to a terminal disclaimer.

(21) Appl. No.: 16/725,929

(22) Filed: Dec. 23, 2019

(65) Prior Publication Data

US 2020/0136701 A1 Apr. 30, 2020

Related U.S. Application Data

(63) Continuation of application No. 16/313,399, filed as application No. PCT/KR2017/006687 on Jun. 26, 2017, now Pat. No. 10,560,171.

(Continued)

(51) Int. Cl.
*H04B 7/06* (2006.01)
*H04W 72/12* (2009.01)
(Continued)

(52) U.S. Cl.
CPC ......... *H04B 7/0626* (2013.01); *H04B 7/0632* (2013.01); *H04B 7/0639* (2013.01);
(Continued)

(58) Field of Classification Search
None
See application file for complete search history.

(56) References Cited

U.S. PATENT DOCUMENTS 8,687,555 B2   4/2014  Ko et al.
8,848,520 B2   9/2014  Chen et al.
(Continued)

FOREIGN PATENT DOCUMENTS

CN   104811269   7/2015
CN   105229952   1/2016
(Continued)

OTHER PUBLICATIONS

PCT International Application No. PCT/KR2017/006687, Written Opinion of the International Searching Authority dated Sep. 26, 2017, 18 pages.

(Continued)

*Primary Examiner* — Gregory B Sefcheck
(74) *Attorney, Agent, or Firm* — Lee Hong Degerman Kang Waimey

(57) ABSTRACT

Disclosed are a method for a terminal to report channel state information (CSI) to a base station, and an apparatus for supporting the same. More specifically, disclosed are a method for a terminal to report CSI in a wireless communication system supporting an unlicensed band by transmitting a physical uplink shared channel (PUSCH) which only includes the CSI without an uplink shared channel (UL-SCH), and apparatuses for supporting the same.

15 Claims, 12 Drawing Sheets

Related U.S. Application Data

(60) Provisional application No. 62/357,336, filed on Jun. 30, 2016, provisional application No. 62/370,721, filed on Aug. 4, 2016, provisional application No. 62/373,316, filed on Aug. 10, 2016, provisional application No. 62/405,211, filed on Oct. 6, 2016.

(51) Int. Cl.
| | |
|---|---|
| *H04W 74/08* | (2009.01) |
| *H04L 5/00* | (2006.01) |
| *H04W 16/14* | (2009.01) |
| *H04W 24/10* | (2009.01) |
| *H04W 48/16* | (2009.01) |
| *H04W 72/04* | (2009.01) |
| *H04B 7/0452* | (2017.01) |
| *H04W 72/14* | (2009.01) |

(52) U.S. Cl.
CPC .......... *H04L 5/0048* (2013.01); *H04W 16/14* (2013.01); *H04W 24/10* (2013.01); *H04W 48/16* (2013.01); *H04W 72/0406* (2013.01); *H04W 72/0446* (2013.01); *H04W 72/0453* (2013.01); *H04W 72/12* (2013.01); *H04W 72/14* (2013.01); *H04W 74/08* (2013.01); *H04W 74/0808* (2013.01); *H04B 7/0452* (2013.01)

(56) References Cited

U.S. PATENT DOCUMENTS

| | | | |
|---|---|---|---|
| 9,094,966 B2 * | 7/2015 | Kim | H04W 72/042 |
| 9,210,670 B2 | 12/2015 | Papasakellariou | |
| 9,232,428 B2 | 1/2016 | Abe et al. | |
| 9,237,563 B2 | 1/2016 | Kim et al. | |
| 9,306,720 B2 | 4/2016 | Takeda et al. | |
| 9,306,725 B2 | 4/2016 | Papasakellariou et al. | |
| 9,432,977 B2 * | 8/2016 | Kim | H04W 72/0413 |
| 9,456,429 B2 | 9/2016 | Ouchi et al. | |
| 9,490,947 B2 | 11/2016 | Lee et al. | |
| 9,491,750 B2 | 11/2016 | Park et al. | |
| 9,693,316 B2 | 6/2017 | Han et al. | |
| 9,854,568 B2 | 12/2017 | Chen et al. | |
| 9,924,498 B2 | 3/2018 | Chen et al. | |
| 9,935,748 B2 | 4/2018 | Seo | |
| 9,936,506 B2 * | 4/2018 | Kim | H04W 72/0446 |
| 9,979,454 B2 | 5/2018 | Nagata et al. | |
| 9,979,581 B2 * | 5/2018 | Yang | H04L 27/2666 |
| 9,985,742 B2 | 5/2018 | Papasakellariou | |
| 9,986,562 B2 * | 5/2018 | Zhu | H04L 1/0027 |
| 10,003,448 B2 * | 6/2018 | Lee | H04L 5/0057 |
| 10,154,490 B2 | 12/2018 | Aiba et al. | |
| 10,218,476 B2 * | 2/2019 | Lunttila | H04W 72/0453 |
| 10,219,295 B2 | 2/2019 | Hugl et al. | |
| 10,257,737 B2 | 4/2019 | Lee et al. | |
| 10,349,320 B2 * | 7/2019 | Nogami | H04W 36/0066 |
| 10,411,861 B2 * | 9/2019 | Lee | H04W 72/042 |
| 10,542,439 B2 * | 1/2020 | Mukherjee | H04W 80/06 |
| 10,615,942 B2 * | 4/2020 | Lee | H04L 5/1469 |
| 10,680,687 B2 * | 6/2020 | Lee | H04B 7/0626 |
| 10,904,783 B2 * | 1/2021 | Chen | H04L 1/1864 |
| 2013/0121301 A1 * | 5/2013 | Kim | H04W 24/10 370/329 |
| 2016/0095101 A1 | 3/2016 | Ye et al. | |
| 2017/0181022 A1 * | 6/2017 | Yang | H04B 7/0456 |
| 2019/0140727 A1 | 5/2019 | Kim et al. | |

FOREIGN PATENT DOCUMENTS

| | | |
|---|---|---|
| CN | 105556888 | 5/2016 |
| CN | 105611637 | 5/2016 |
| CN | 105722242 | 6/2016 |
| EP | 2600547 | 6/2013 |
| WO | 2015084048 | 6/2015 |
| WO | 2015147593 | 10/2015 |
| WO | 2016021954 | 2/2016 |
| WO | 2016071021 | 5/2016 |

OTHER PUBLICATIONS

LG Electronics, "Multi-subframe scheduling in LAA", 3GPP TSG RAN WG1 Meeting #84bis, R1-162466, Apr. 2016, 5 pages.

LG Electronics, "Further details on channel across in LAA UL", 3GPP TSG RAN WG1 Meeting #85, R1-164503, May 2016, 8 pages.

LG Electronics, "Proposal for aperiodic CSI only PUSCH without UL-SCH", 3GPP TSG RAN WG1 Meeting #84, R1-160600, Feb. 2016, 6 pages.

ETSI, "LTE; Evolved Universal Terrestrial Radio Access (E-UTRA); Physical layer procedures (3GPP TS 36.213 version 13.0.0 Release 13)," ETSI TS 136 213 V13.0.0, May 2016, 328 pages.

Samsung, "PUSCH Scheduling for LAA", 3GPP TSG RAN WG1 Meeting #85, R1-164741, May 2016, 3 pages.

Samsung, "UCI Transmission on LAA SCell", 3GPP TSG RAN WG1 Meeting #85, R1-164747, May 2016, 4 pages.

European Patent Office Application Serial No. 17820487.1, Search Report dated Jan. 29, 2020, 7 pages.

MCC Support, R1-165448, Final Report of 3GPP TSG RAN WG1 #84bis v1.0.0, 3GPP TSG RAN WG1 #85, May 22, 2016. See p. 42, 46. (Year: 2016).

3GPP, TS36.213 v13.1.1, May 25, 2016. See p. 29. (Year: 2016).

U.S. Appl. No. 16/313,399, Notice of Allowance dated Sep. 23, 2019, 10 pages.

U.S. Appl. No. 16/313,399, Notice of Allowance dated Jun. 27, 2019, 22 pages.

The State Intellectual Property Office of the People's Republic of China Application Serial No. 201780040554.6, Office Action dated Jul. 26, 2021, 11 pages.

\* cited by examiner

FIG. 10
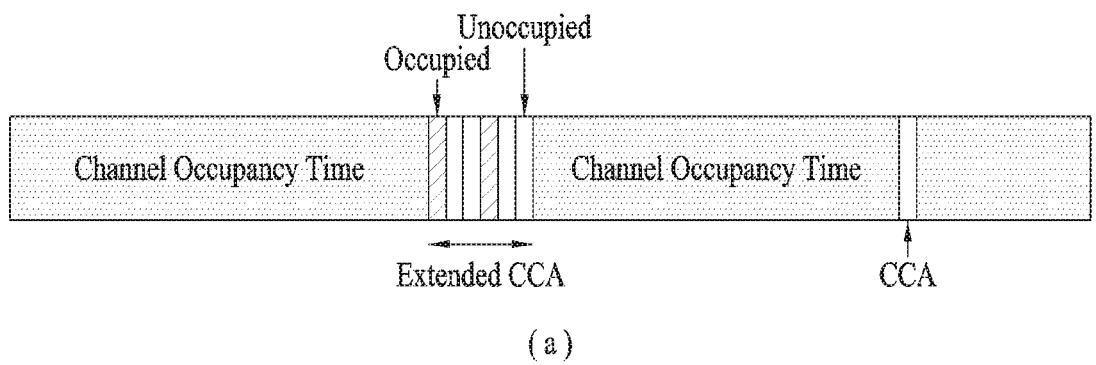
(a)
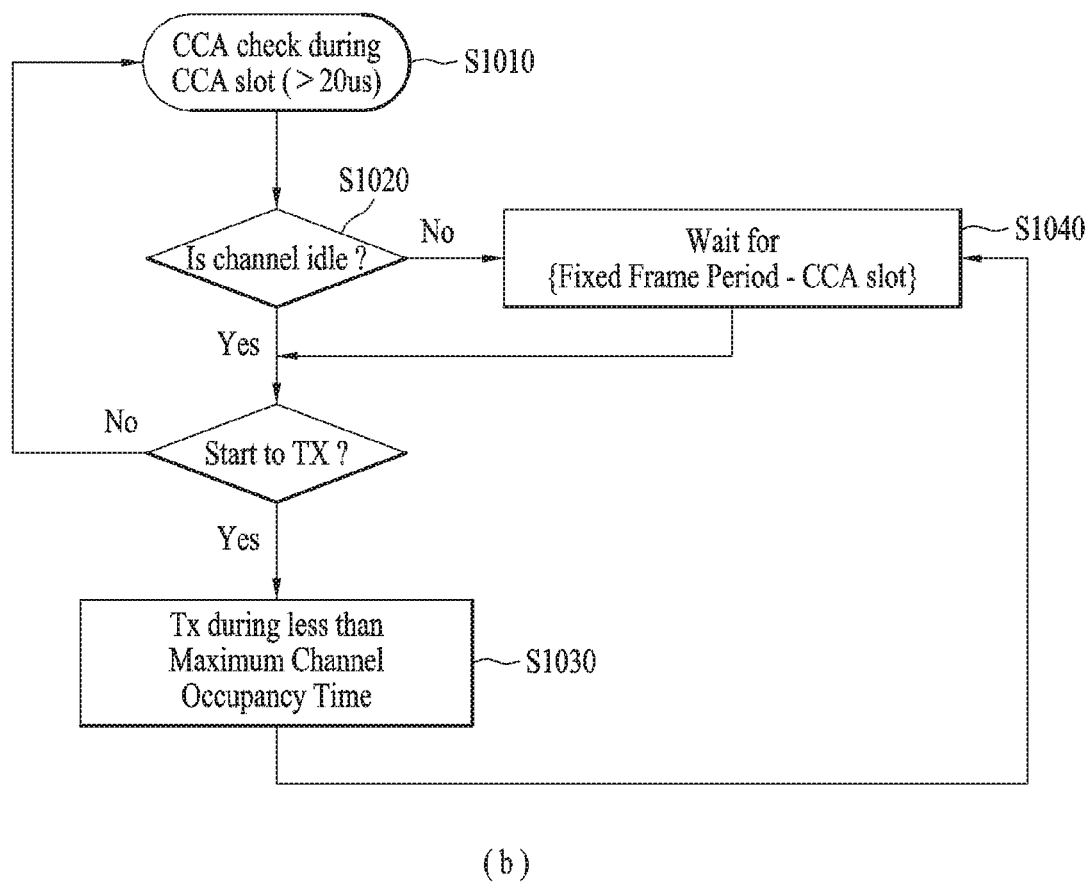
(b)

METHOD FOR REPORTING CHANNEL STATE INFORMATION IN WIRELESS COMMUNICATION SYSTEM SUPPORTING UNLICENSED BAND, AND APPARATUS FOR SUPPORTING SAME

CROSS-REFERENCE TO RELATED APPLICATIONS

This application is a continuation of U.S. patent application Ser. No. 16/313,399, filed on Dec. 26, 2018, issued as U.S. Pat. No. 10,560,171 on Feb. 11, 2020, which is the National Stage filing under 35 U.S.C. 371 of International Application No. PCT/KR2017/006687, filed on Jun. 26, 2017, which claims the benefit of U.S. Provisional Application Nos. 62/357,336, filed on Jun. 30, 2016, 62/370,721 filed on Aug. 4, 2016, 62/373,316, filed on Aug. 10, 2016, and 62/405,211, filed on Oct. 6, 2016, the contents of which are all hereby incorporated by reference herein in theft entirety.

TECHNICAL FIELD

The present invention relates to a wireless communication system supporting an unlicensed band, and more particularly, to a method of reporting Channel State Information (CSI) to a base station by a terminal in a wireless communication system supporting an unlicensed band and apparatuses for supporting the same.

Specifically, the present invention is directed to a method in which a terminal transmits aperiodic CSI that includes only CSI without an Uplink Shared Channel (UL-SCH) to a base station in a wireless communication system supporting an unlicensed band and apparatuses for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

In addition, as more communication devices require higher communication capacity, the necessity of a method capable of operating communication devices in an accessible unlicensed band in a contention-based manner increases.

DISCLOSURE OF THE INVENTION

Technical Task

An object of the present invention is to provide a method of reporting CSI to a base station by a terminal in a wireless communication system supporting an unlicensed band and apparatuses therefor.

Another object of the present invention is to provide a CSI reporting method for a terminal when the terminal transmits a physical uplink shared channel including only CSI without a UL-SCH and apparatuses therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention discloses a method of reporting CSI by a terminal (user equipment) in a wireless communication system supporting an unlicensed band and apparatuses therefor.

In an aspect of the present invention, provided is a method of reporting Channel State Information (CSI) by a User Equipment (UE) in a wireless communication system supporting an unlicensed band. The method may include: receiving, from a Base Station (BS), an uplink grant being composed of a Downlink Control Information (DCI) format capable of scheduling uplink transmission in one or more subframes in the unlicensed band; and transmitting a Physical Uplink Shared Channel (PUSCH) including the CSI without Uplink Shared Channel (UL-SCH) only when the uplink grant schedules uplink transmission in a single subframe.

In another aspect of the present invention, provided is a User Equipment (UE) for reporting Channel State Information (CSI) in a wireless communication system supporting an unlicensed band. The UE may include: a transmitter; a receiver; and a processor connected to the transmitter and the receiver. The processor may be configured to: receive, from a Base Station (BS), an uplink grant being composed of a Downlink Control Information (DCI) format capable of scheduling uplink transmission in one or more subframes in the unlicensed band; and transmit a Physical Uplink Shared Channel (PUSCH) including the CSI without Uplink Shared Channel (UL-SCH) only when the uplink grant schedules uplink transmission in a single subframe.

The uplink grant may include a CSI request bit configured to trigger aperiodic CSI reporting.

The PUSCH including the CSI without UL-SCH may be transmitted in the single subframe scheduled by the uplink grant.

A value of a Modulation and Coding Scheme (MCS) field in the uplink grant may be set to 29.

The PUSCH including the CSI without UL-SCH may be transmitted in the unlicensed band, and the UE may perform a Listen Before Talk (LBT) operation to transmit the PUSCH including the CSI with no UL-SCH in the unlicensed band.

The DCI format capable of scheduling the uplink transmission in the one or more subframes in the unlicensed band may include DCI format 0B or DCI format 4B.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

As is apparent from the above description, the embodiments of the present disclosure have the following effects.

According to the present invention, a terminal can report CSI to a base station adaptively to a Downlink Control Information (DCI) format(s) newly defined for an unlicensed band.

In particular, if the newly defined DCI format(s) satisfies predetermined conditions, the terminal can perform CSI reporting more efficiently by transmitting a PUSCH including only CSI with no UL-SCH.

Effects obtainable from the present invention are non-limited by the above mentioned effect. And, other unmentioned effects can be clearly understood from the following description by those having ordinary skill in the technical field to which the present invention pertains. That is, effects which are not intended by the present invention may be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 10 is a diagram illustrating an exemplary Load Based Equipment (LBE) operation as one of the LBT operations;

BEST MODE FOR INVENTION

Figure 1:
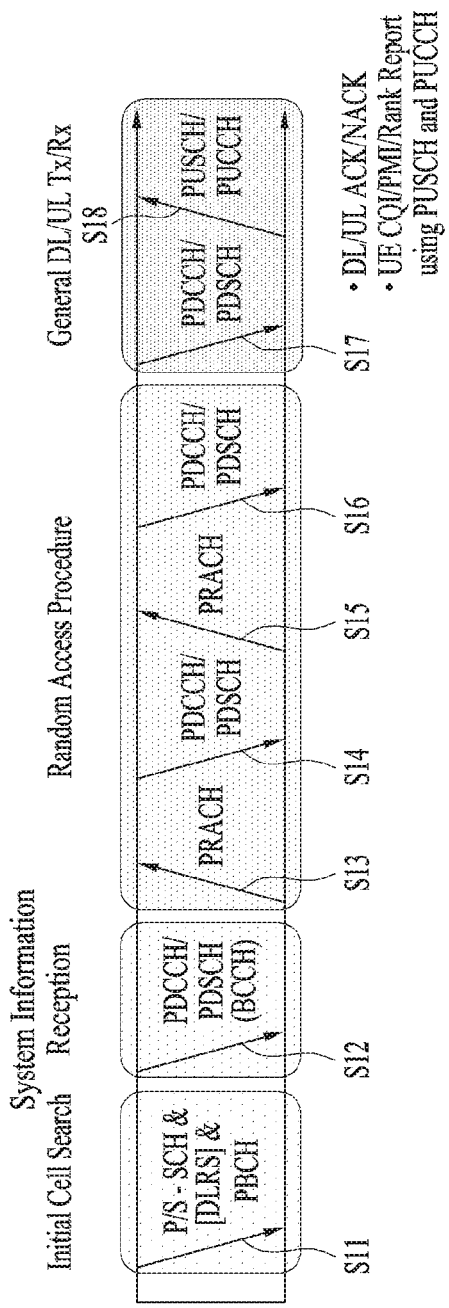
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), and CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Overview

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S12). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
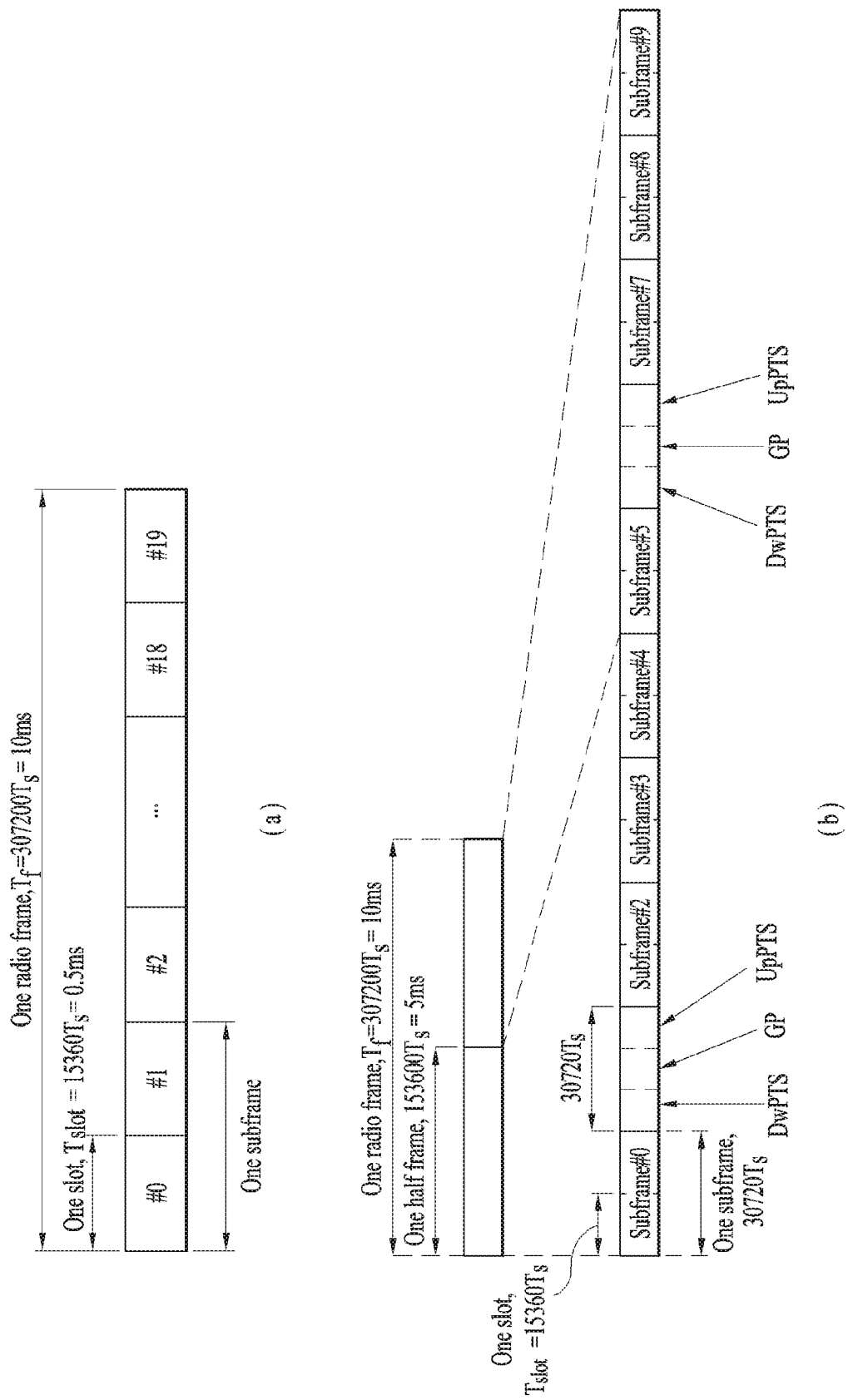
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Figure 5:
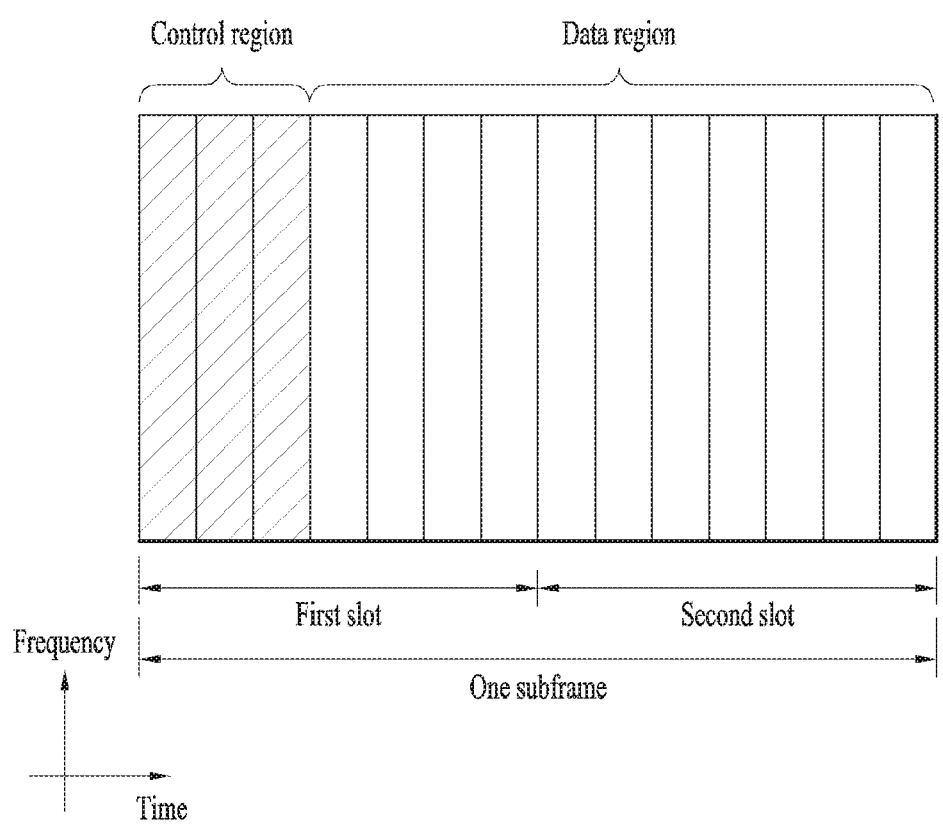
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2. CSI Reporting

In the 3GPP LTE (-A) system, a UE is defined to report CSI to a BS (eNB). Herein, the CSI means information indicating the quality of a radio channel (also called a link)

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
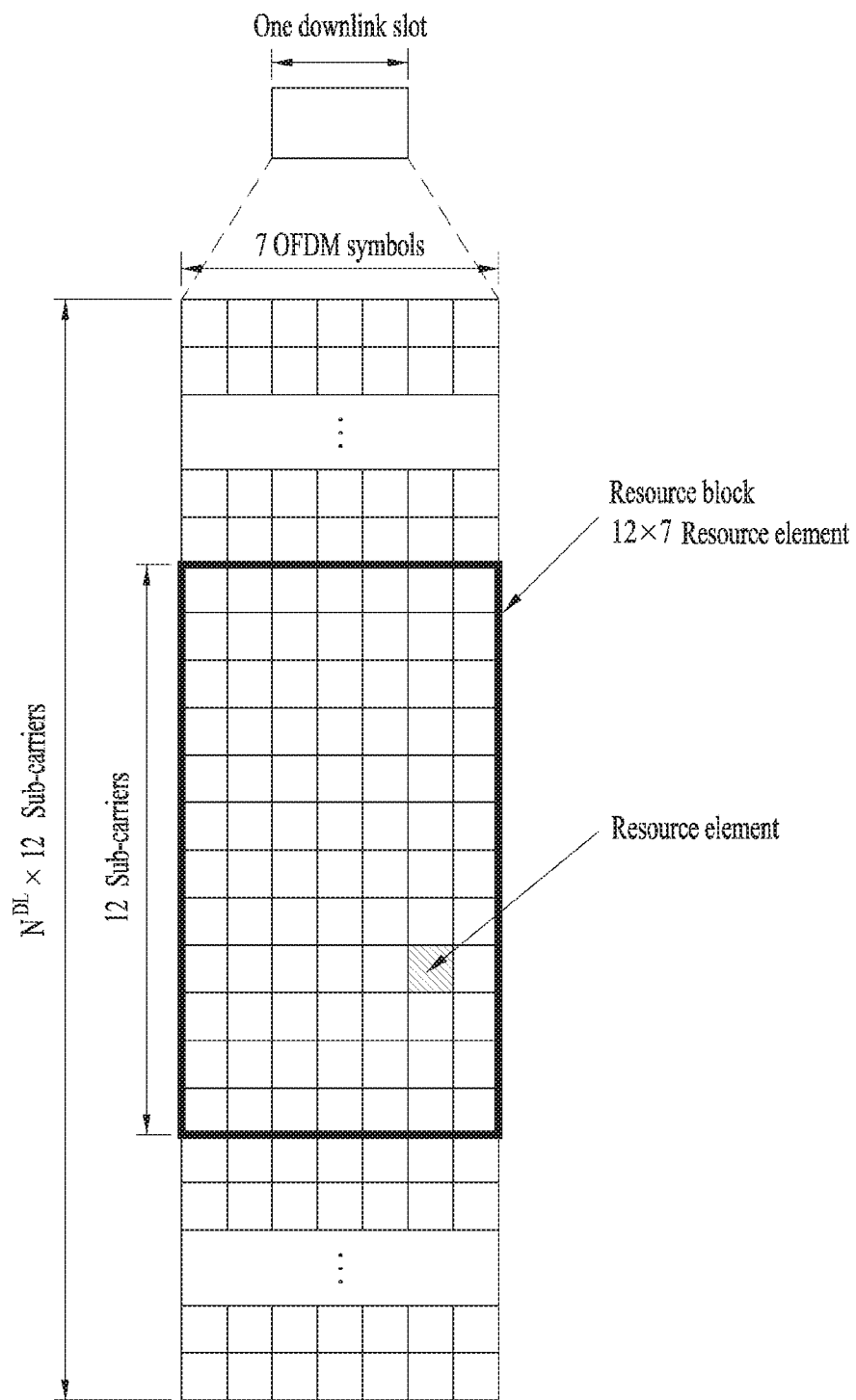
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A structure of an uplink slot may be identical to a structure of a downlink slot.

Figure 4:
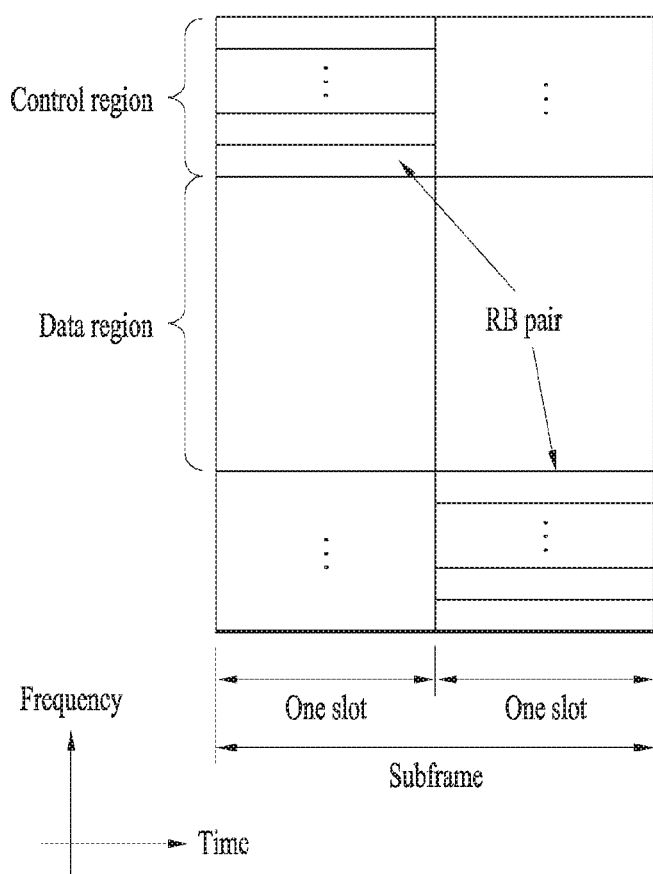
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair frequency-hops over a slot boundary.

created between a UE and an antenna port. The CSI includes, for example, a Rank Indicator (RI), a Precoding Matrix Indicator (PMI), and a Channel Quality Indicator (CQI). Herein, the RI, which indicates rank information of a channel, means the number of streams that a UE receives on the same time-frequency resource. The RI value is determined depending on long-term fading of the channel, and thus it is usually fed back to the BS by the UE with a longer periodicity than that of the PMI or CQI. The PMI is a value reflecting the channel space property and indicates a precoding index preferred by the UE based on a metric such as a signal-to-interference-plus-noise ratio (SINR). The CQI is a value indicating the intensity of a channel and typically indicates a received SINR obtained when the BS uses the PMI.

Based on measurement of the radio channel, the UE calculates a preferred PMI and RI, which is capable of deriving the optimal or highest transmission rate when used by the BS, in the current channel state and feeds back the calculated PMI and RI to the BS. Herein, the CQI refers to a modulation and coding scheme of providing an acceptable packet error probability for the fed-back PMI/RI.

The LTE-A system, where accurate MU-MIMO and explicit CoMP operations are expected, may not sufficiently support new operations due to the CSI feedback defined in LTE. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

Table 2 below shows uplink channels used for CSI transmission in the 3GPP LTE (-A) system.

TABLE 2

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 2, CSI may be transmitted using a Physical Uplink Control Channel (PUCCH) with a periodicity defined in higher layers. Depending on whether it is needed by a scheduler, the CSI may be aperiodically transmitted using a Physical Uplink Shared Channel (PUSCH). Transmission of the CSI over the PUSCH is possible only in the case of frequency selective scheduling and aperiodic CSI transmission. Hereinafter, CSI transmission schemes according to scheduling schemes and periodicities will be described.

1) Transmission of CQI/PMI/RI on PUSCH after reception of a CSI transmission request control signal (CSI request)

A PUSCH-scheduling control signal (UL grant) transmitted as a PDCCH signal may include a control signal for requesting CSI transmission. Table 3 below shows UE modes for transmitting the CQI, PMI and RI on the PUSCH.

TABLE 3

| | | PMI Feedback Type | | |
|---|---|---|---|---|
| | | No PMI | Single PMI | Multiple PMIs |
| PUSCH CQI Feed back Type | Wideband (Wideband CQI) | | | Mode 1-2 RI 1st wideband CQI(4 bit) 2nd wideband CQI(4 bit) if RI > 1 N*Subband PMI(4 bit) (N is the total # of subbands) (if 8Tx Ant, N*subband W2 + wideband W1) |
| | UE selected (Subband CQI) | Mode 2-0 RI (only for Open-loop SM) 1st wideband CQI(4 bit) + Best-M CQI(2 bit) (Best-M CQI: Average CQI for M SBs selected from among total N SBs) Best-M index (L bit) | | Mode 2-2 RI 1st wideband CQI(4 bit) + Best-M CQI(2 bit) 2nd wideband CQI(4 bit) + Best-M CQI(2 bit) if RI > 1 * Best-M index (L bit) Wideband PMI(4 bit) + Best-M PMI(4 bit) (if 8Tx Ant, wideband W2 + Best-M W2 + wideband W1) |
| | Higher Layer-configured (Subband CQI) | Mode 3-0 RI (only for Open-loop SM) 1st wideband CQI(4 bit) + N*subbandCQI(2 bit) | Mode 3-1 RI 1st wideband CQI(4 bit) + N*subbandCQI(2 bit) 2nd wideband CQI(4 bit) + N*subbandCQI(2 bit) if RI > 1 Wideband PMI(4 bit) (if 8Tx Ant, wideband W2 + wideband W1) | Mode 3-2 RI 1st wideband CQI(4 bit) + N*subbandCQI(2 bit) 2nd wideband CQI(4 bit) + N*subbandCQI(2 bit) if RI > 1 N*Subband PMI(4 bit) (N is the total # of subbands) (if 8Tx Ant, N*subband W2 + wideband W1) |

The transmission modes of Table 3 are selected by higher layers, and the CQI/PMI/RI are all transmitted in a PUSCH subframe. Hereinafter, uplink transmission methods performed by a UE in the individual modes will be described.

Mode 1-2 represents a case where precoding matrices are selected on the assumption that data is transmitted only in subbands. A UE generates a CQI on the assumption that a precoding matrix is selected for the system band or the entirety of a band (set S) designated by higher layers. In Mode 1-2, the UE may transmit the CQI and a PMI value for each subband. In this case, the size of each subband may depend on the size of the system band.

In Mode 2-0, a UE may select M preferred subbands for the system band or band (set S) designated by higher layers. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI (WB-CQI) index.

The UE in mode 2-0 may transmit, to a BS, information on the locations of the M selected subbands, one CQI value for the M selected subbands, and a CQI value generated for the entire band or designated band (set S). In this case, the size of each subband and the value of M may depend on the size of the system band.

In Mode 2-2, a UE may simultaneously select locations of M preferred subbands and a single precoding matrix for the M preferred subbands on the assumption that data is transmitted through the M preferred subbands. In this case, a CQI value for the M preferred subbands is defined per codeword. In addition, the UE additionally generates a wideband CQI value for the system band or designated band (set S).

The UE in Mode 2-2 may transmit, to a BS, information on the locations of the M preferred subbands, one CQI value for the M selected subbands, a single PMI for the M preferred subbands, a wideband PMI, and a wideband CQI value. In this case, the size of a subband and the value of M may depend on the size of the system band.

In Mode 3-0, a UE generates a wideband CQI value. The UE generates a CQI value for each subband on the assumption that data is transmitted through each subband. In this case, even if an RI>1, the CQI value represents only the CQI value for the first codeword.

In Mode 3-1, a UE generates a single precoding matrix for the system band or designated band (set S). The UE generates a CQI subband for each codeword by assuming the single precoding matrix generated for each subband. In addition, the UE may generate a wideband CQI by assuming the single precoding matrix. The CQI value for each subband may be expressed in a differential form. The subband CQI value is calculated as a difference between subband CQI and wideband CQI indices. In this case, the size of each subband may depend on the size of the system band.

In Mode 3-2, a UE generates a precoding matrix for each subband instead of a single precoding matrix for the entire band, in contrast with Mode 3-1.

2) Periodic CQI/PMI/RI transmission through PUCCH

A UE may periodically transmit CSI (e.g., CQI/PMI/PTI (precoding type indicator) and/or RI information) to a BS on a PUCCH. If the UE receives a control signal instructing transmission of user data, the UE may transmit a CQI on the PUCCH. Even if the control signal is transmitted on a PUSCH, the CQI/PMI/PTI/RI may be transmitted in one of the modes defined in Table 4 below.

TABLE 4

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selection (subband CQI) | Mode 2-0 | Mode 2-1 |

A UE may operate in transmission modes shown in Table 4. Referring to Table 4, in Mode 2-0 and Mode 2-1, a Bandwidth Part (BP) may mean a set of consecutive subbands in the frequency domain and cover the system band or designated band (set S). In Table 3, the size of each subband, the size of a BP, and the number of BPs may depend on the size of the system band. In addition, the UE transmits CQIs for individual BPs in ascending order in the frequency domain in order to cover the system band or designated band (set S).

The UE may have the following PUCCH transmission types according to transmission combinations of CQI/PMI/PTI/RI.

i) Type 1: a subband CQI (SB-CQI) for Mode 2-0 and Mode 2-1 is transmitted.
ii) Type 1a: an SB CQI and a second PMI are transmitted.
iii) Types 2, 2b and 2c: a WB-CQI and PMI are transmitted.
iv) Type 2a: a WB PMI is transmitted.
v) Type 3: an RI is transmitted.
vi) Type 4: a WB CQI is transmitted.
vii) Type 5: an RI and a WB PMI are transmitted.
viii) Type 6: an RI and a PTI are transmitted.

When the UE transmits an RI and a WB CQI/PMI, the CQI/PMI are transmitted in subframes with different periodicities and offsets. If the RI needs to be transmitted in the same subframe as the WB CQI/PMI, the CQI/PMI are not transmitted.

The current LTE standard uses the 2-bit CSI request field in DCI format 0 or 4 to provide aperiodic CSI feedback, considering a carrier aggregation (CA) environment. In the CA environment, if multiple serving cells are configured for a UE, the UE interprets a CSI request field as two bits. If one of TMs 1 to 9 is set for all Component Carriers (CCs), aperiodic CSI feedback is triggered according to the values in Table 5 below. And, if TM 10 is set for at least one of the CCs, the aperiodic CSI feedback is triggered according to the values in Table 6 below.

TABLE 5

| CSI request field value | Description |
|---|---|
| '00' | No aperiodic CSI reporting is triggered |
| '01' | Aperiodic CSI reporting is triggered for a serving cell |
| '10' | Aperiodic CSI reporting is triggered for a first group of serving cells configured by higher layers |
| '11' | Aperiodic CSI reporting is triggered for a second group of serving cells configured by higher layers |

TABLE 6

| CSI request field value | Description |
|---|---|
| '00' | No aperiodic CSI reporting is triggered |
| '01' | Aperiodic CSI reporting is triggered for a CSI process group configured by higher layers for a serving cell |
| '10' | Aperiodic CSI reporting is triggered for a first group of CSI processes configured by higher layers |
| '11' | Aperiodic CSI reporting is triggered for a second group of CSI processes configured by higher layers |

1.3. Dual Connectivity

Figure 6:
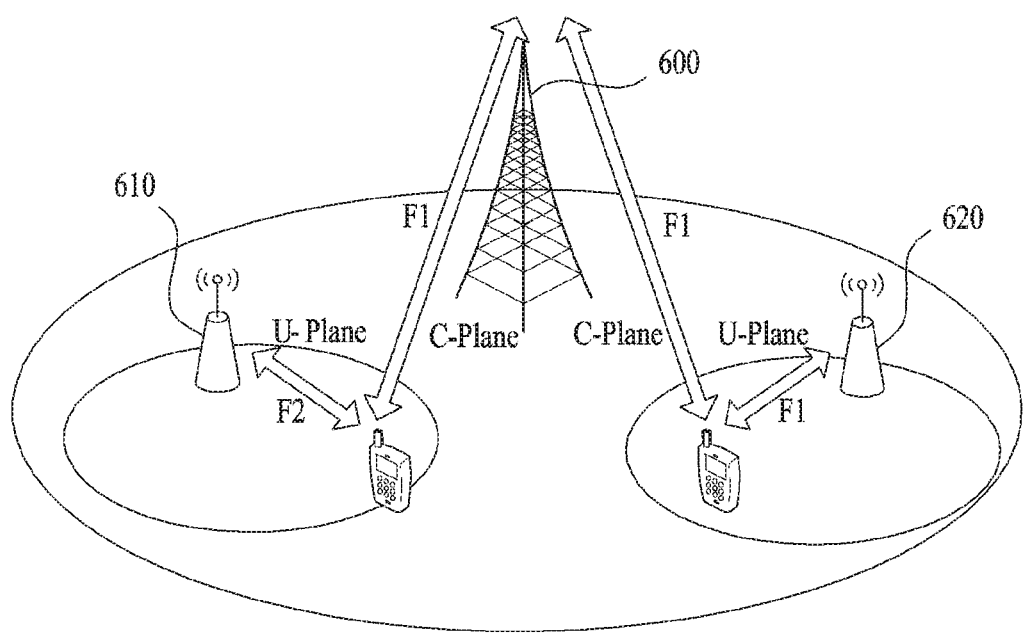
FIG. 6 is a diagram illustrating the concept of dual connectivity applicable to the present invention

FIG. 6 illustrates the concept of dual connectivity applicable to the present invention.

Referring to FIG. 6, carrier aggregation may be performed among a macro cell 600 and small cells 610 and 620. That is, the macro cell may use n carriers (where n is a random positive integer), and a small cell may use k carriers (where k is a random positive integer). In this case, the carriers of the macro and small cells may have the same or different frequencies. For instance, the macro cell may use random frequencies F1 and F2, and the small cell may use random frequencies F2 and F3.

A random UE in coverage of the small cell may be simultaneously connected to the macro and small cells. The UE may be served by the macro and small cells at the same time or through Time Division Multiplexing (TDM). The UE may be served functions provided by the C-plane (e.g., connection management, mobility, etc.) through a macro cell layer. In the case of the U-plane data path, the UE may select the macro cell and/or small cell. For example, in case of real-time data such as Voice over LTE (VoLTE), the UE may use the reception/transmission function provided by the macro cell, which can guarantee better mobility than the small cell. For a best-effort service, the UE may be served by the small cell. The macro and small cells may be connected through backhaul, and the backhaul may be ideal backhaul or non-ideal backhaul.

In addition, the macro and small cells may be configured to use the same system, i.e., one of the TDD and FDD system. Alternatively, the macro and small cells may be configured to use different systems, that is, one of them cell uses the TDD system and the other uses the FDD system.

The concept of the dual connectivity has been described with reference to FIG. 6. The macro and small cells may use the same or different frequency bands. If a random UE is configured to operate in dual connectivity mode, the UE may be connected to the macro and small cells at the same time. FIG. 6 shows a case in which a small cell is set as the U-plane data path.

Although the present invention describes that the random UE is dual-connected to the macro and small cells for convenience of description, the invention is not limited to cell types (e.g., macro cell, micro cell, pico cell, femto cell, etc.). In addition, although the present invention describes that the random dual-connectivity UE configures the carrier aggregation (CA) by setting the macro cell to a Primary cell (Pcell) and the small cell to a Secondary cell (Scell), the invention is not limited thereto.

2. LTE-U System 2.1. LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 7:
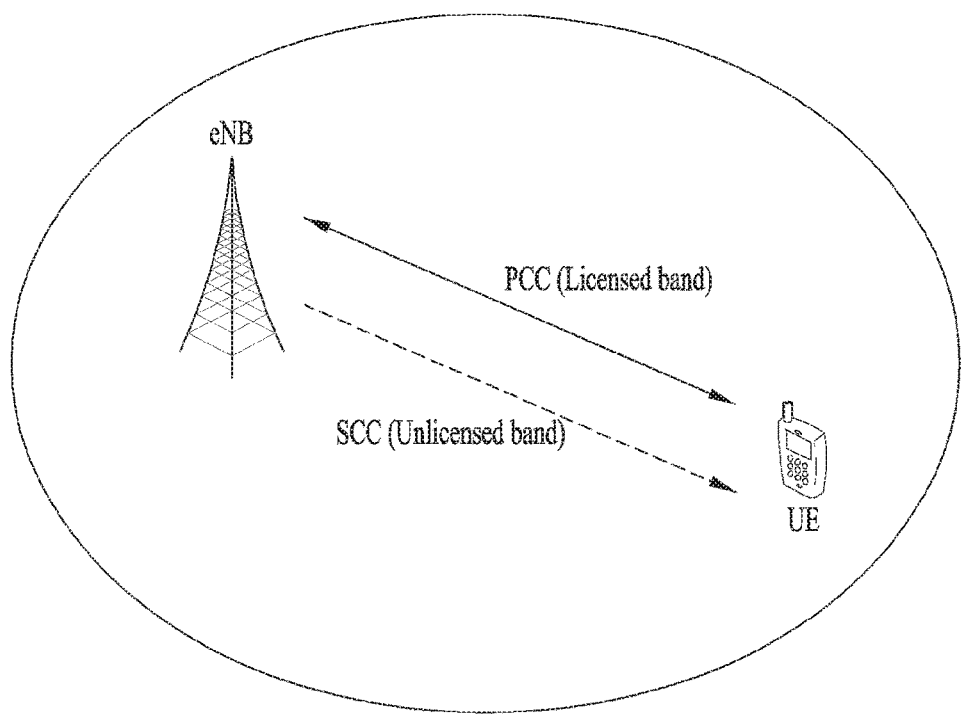
FIG. 7 is a diagram illustrating an exemplary CA environment supported in an LTE-Unlicensed (LTE-U) system.

FIG. 7 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 7, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 7 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 8:
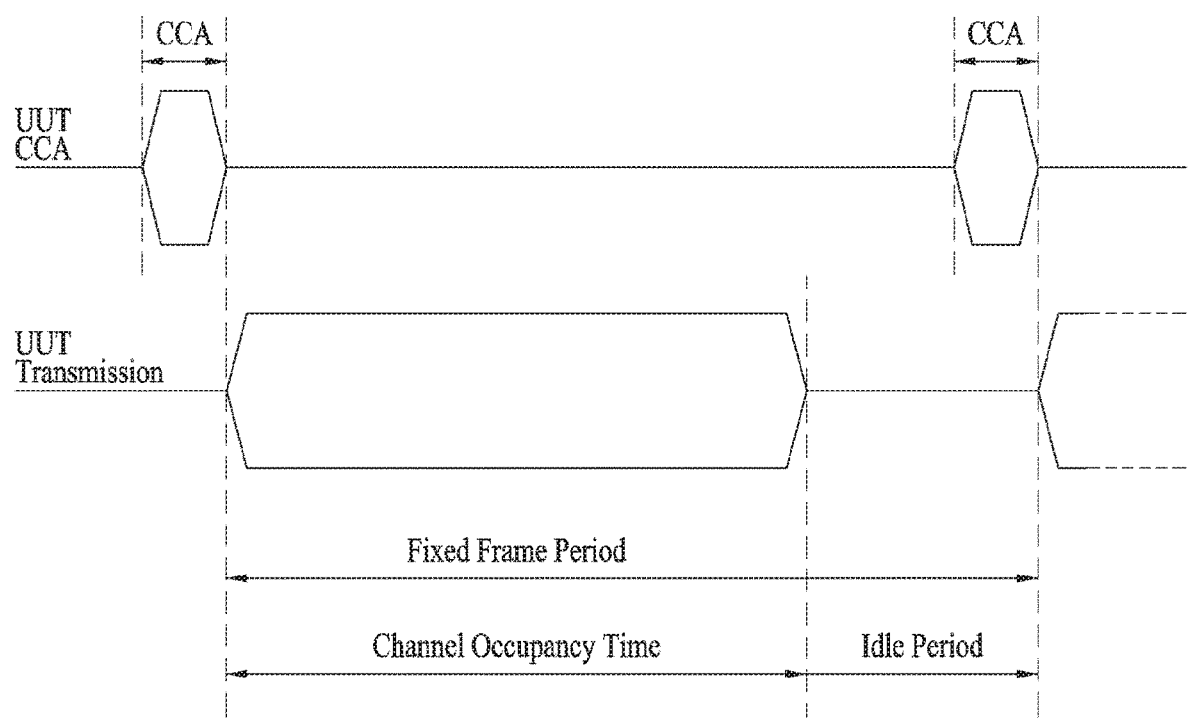
FIG. 8 is a diagram illustrating an exemplary Frame Based Equipment (FBE) operation as one of Listen-Before-Talk (LBT) operations.

FIG. 8 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 9:
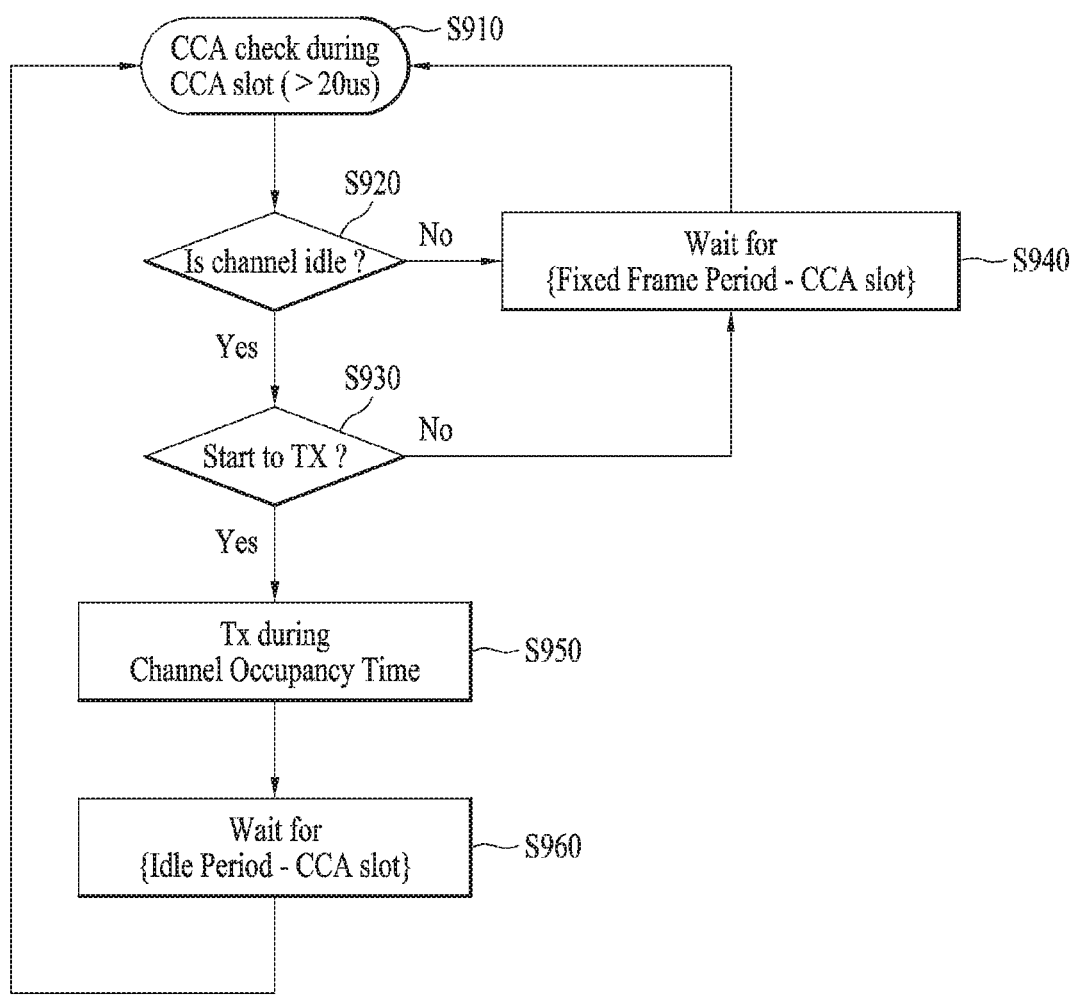
FIG. 9 is a block diagram illustrating the FBE operation.

FIG. 9 is a block diagram illustrating the FBE operation.

Referring to FIG. 9, a communication node (i.e., eNB) managing an SCell performs CCA during a CCA slot [S910]. If the channel is idle [S920], the communication node performs data transmission (Tx) [S930]. If the channel is busy, the communication node waits for a time period calculated by subtracting the CCA slot from a fixed frame period, and then resumes CCA [S940].

The communication node transmits data during the channel occupancy time [S950]. Upon completion of the data transmission, the communication node waits for a time period calculated by subtracting the CCA slot from the idle period [S960], and then resumes CCA [S910]. If the channel is idle but the communication node has no transmission data, the communication node waits for the time period calculated by subtracting the CCA slot from the fixed frame period [S940], and then resumes CCA [S910].

FIG. 10 is a view illustrating an exemplary LBE operation as one of the LBT operations.

Referring to FIG. 10(a), in LBE, the communication node first sets q (q E {4, 5, . . . , 32}) and then performs CCA during one CCA slot.

FIG. 10(b) is a block diagram illustrating the LBE operation. The LBE operation will be described with reference to FIG. 10(b).

The communication node may perform CCA during a CCA slot [S1010]. If the channel is unoccupied in a first CCA slot [S1020], the communication node may transmit data by securing a time period of up to (13/32)q ms [S1030].

On the contrary, if the channel is occupied in the first CCA slot, the communication node selects N (N∈{1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms [S1040].

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 11:
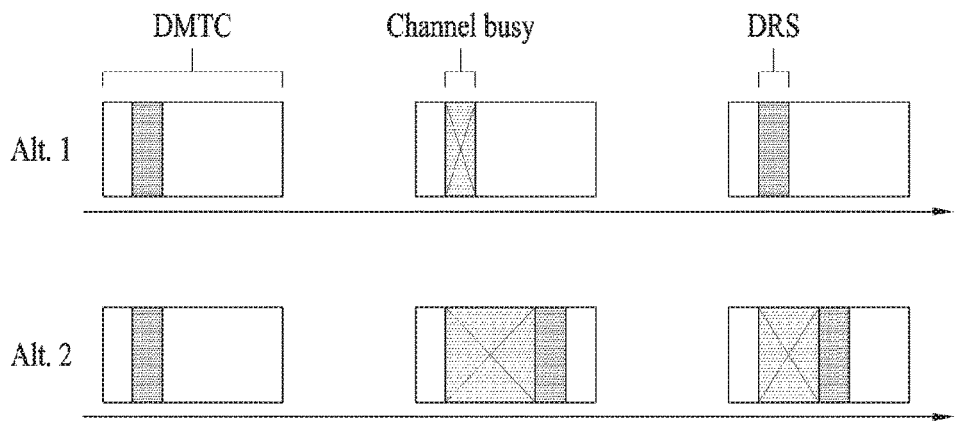
FIG. 11 is a diagram for explaining methods of transmitting a DRS supported in an LAA system.

FIG. 11 is a diagram for explaining DRS transmission methods supported by LAA system.

Referring to FIG. 11, the upper part of FIG. 11 shows the aforementioned first scheme for transmitting a DRS and the bottom part of FIG. 11 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 12:
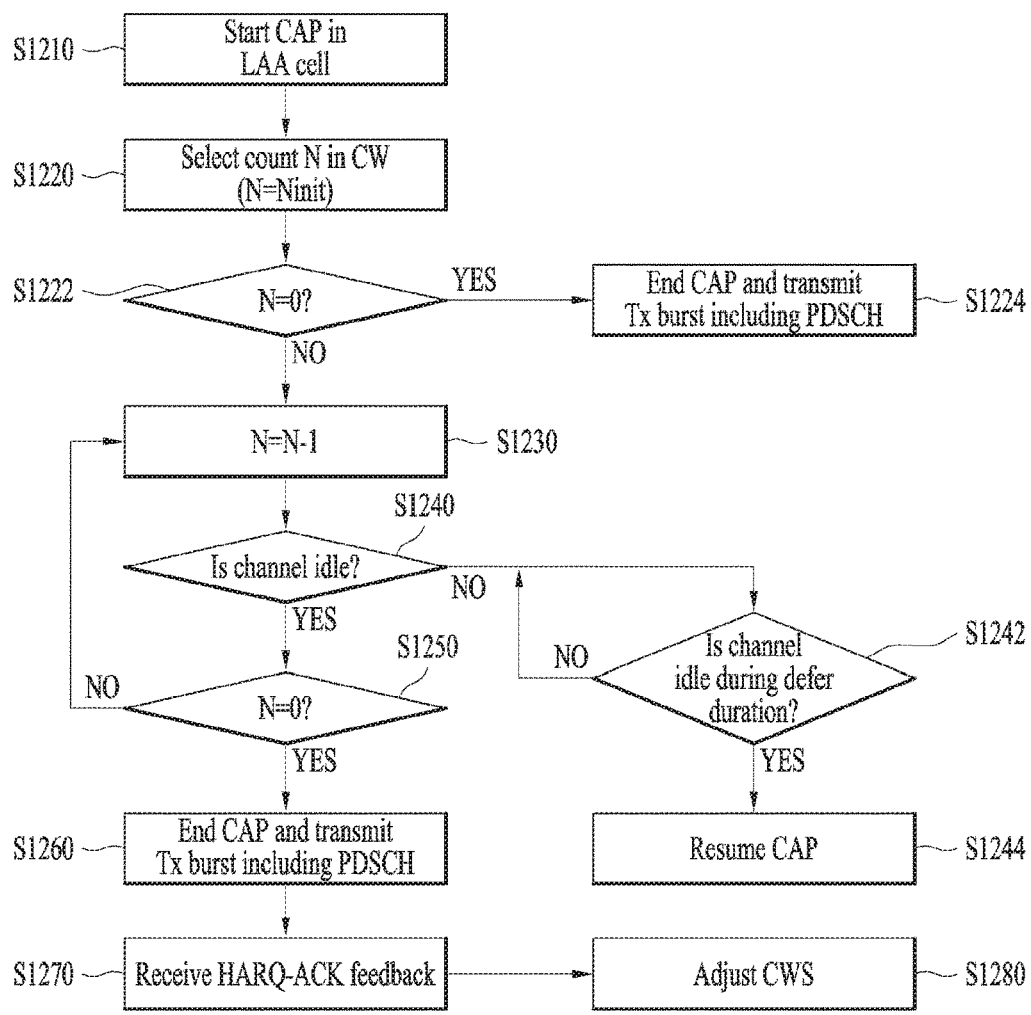
FIG. 12 is a flowchart for explaining CAP and CWA.

FIG. 12 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1210].

The base station can randomly select a back-off counter N from a contention window (CW). In this case, the N is configured by an initial value Ninit [S1220]. The Ninit is randomly selected from among values ranging from 0 to $CW_p$.

Subsequently, if the back-off counter value (N) corresponds to 0 [S1222], the base station terminates the CAP and performs Tx burst transmission including PSCH [S1224]. On the contrary, if the back-off value is not 0, the base station reduces the back-off counter value by 1 [S1230].

The base station checks whether or not a channel of the LAA Scell(s) is in an idle state [S1240]. If the channel is in the idle state, the base station checks whether or not the back-off value corresponds to 0 [S1250]. The base station repeatedly checks whether or not the channel is in the idle state until the back-off value becomes 0 while reducing the back-off counter value by 1.

In the step S1240, if the channel is not in the idle state i.e., if the channel is in a busy state, the base station checks whether or not the channel is in the idle state during a defer duration (more than 15 usec) longer than a slot duration (e.g., 9 usec) [S1242]. If the channel is in the idle state during the defer duration, the base station can resume the CAP [S1244]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1242 again to check whether or not the channel is in the idle state during a new defer duration.

Referring back to FIG. 11, the base station checks whether or not the back-off counter value (N) becomes 0 [S1250]. If the back-off counter value (N) becomes 0, the base station terminates the CAP and may be able to transmit a Tx burst including PDSCH.

The base station can receive HARQ-ACK information from a UE in response to the Tx burst [S1270]. The base station can adjust a CWS (contention window size) based on the HARQ-ACK information received from the UE [S1280].

In the step S1280, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1260, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

2.6. Channel Access Priory Class

TABLE 7

| Channel Access Priority Class (p) | $m_p$ | $CW_{min,p}$ | $CW_{max,p}$ | $T_{m\ cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

As shown in Table 7, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 7, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

2.7. Subframe Structure Applicable to LAA System

Figure 13:
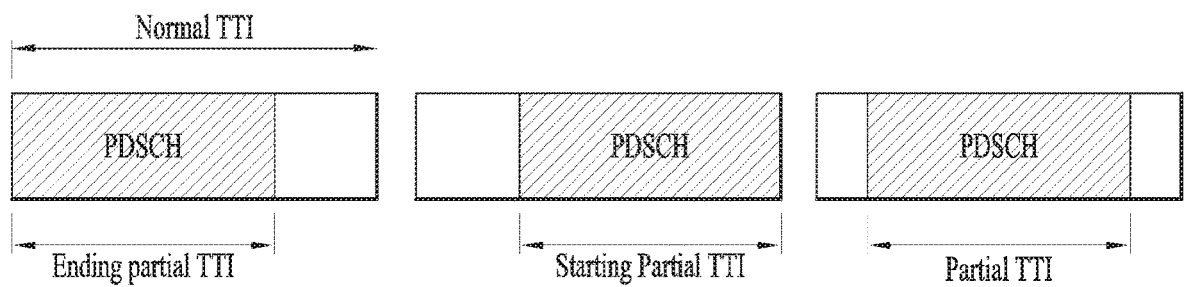
FIG. 13 is a diagram illustrating a partial TTI or a partial subframe applicable to the present invention.

FIG. 13 is a diagram illustrating a partial TTI or a partial subframe applicable to the present invention.

In Rel-13 LAA system, MCOT is utilized as much as possible when DL Tx burst is transmitted. In order to support consecutive transmission, a partial TTI, which is defined as DwPTS, is introduced. The partial TTI (or partial subframe) corresponds to a section in which a signal is transmitted as much as a length shorter than a legacy TTI (e.g., 1 ms) when PDSCH is transmitted.

In the present invention, for clarity, a starting partial TTI or a starting partial subframe corresponds to a form that a part of symbols positioned at the fore part of a subframe are emptied out. An ending partial TTI or an ending partial subframe corresponds to a form that a part of symbols positioned at the rear part of a subframe are emptied out. (On the contrary, an intact TTI is referred to as a normal TTI or a full TTI.)

FIG. 13 illustrates various types of the aforementioned partial TTI. The first drawing of FIG. 13 illustrates an ending partial TTI (or subframe) and the second drawing illustrates a starting partial TTI (or subframe). The third drawing of FIG. 13 illustrates a partial TTI (or subframe) that a part of symbols positioned at the fore part and the rear part of a subframe are emptied out. In this case, when signal transmission is excluded from a normal TTI, a time section during which the signal transmission is excluded is referred to as a transmission gap (TX gap).

Although the present invention is explained on the basis of a DL operation in FIG. 13, the present invention can also be identically applied to a UL operation. For example, a partial TTI structure shown in FIG. 13 can be applied to a form of transmitting PUCCH or PUSCH as well.

3. Proposed Embodiment

Based on the above technical discussion, the present invention proposes methods in which a UE performs periodic CSI transmission and aperiodic CSI transmission in a CA environment including LAA SCells.

3.1. Periodic CSI (pCSI) Transmission

Before describing pCSI transmission at a UE according to the present invention, the pCSI transmission methods in the legacy LTE system will be described.

<pCSI Transmission Methods in the Legacy LTE System>

(1) PUCCH format 1/2

(A) If aperiodic CSI is triggered, pCSI is dropped.

(B) If simultaneous transmission of PUCCH/PUSCH is configured on, 1) if there is HARQ-ACK to be transmitted, A) if simultaneous transmission of the pCSI and HARQ-ACK on the PUCCH is configured on, 1> if there is a scheduled PUSCH, the HARQ-ACK is transmitted using PUCCH format 1 and the pCSI is transmitted on the PUSCH.

2> if there is no scheduled PUSCH, the HARQ-ACK and pCSI is transmitted using PUCCH format 2.

B) if simultaneous transmission of the pCSI and HARQ-ACK on the PUCCH is configured off, 1> if there is a scheduled PUSCH, the HARQ-ACK is transmitted using PUCCH format 1 and the pCSI is transmitted on the PUSCH.

2> if there is no scheduled PUSCH, the HARQ-ACK is transmitted using PUCCH format 1 and the pCSI is dropped.

2) if there is no HARQ-ACK to be transmitted, the pCSI is transmitted using PUCCH format 2.

(C) If simultaneous transmission of PUCCH/PUSCH is configured off, 1) if there is a scheduled PUSCH, the pCSI is transmitted on a PUSCH with the lowest SCell index (lowest SCellIndex cell PUSCH).

2) if there is no scheduled PUSCH,

A) if there is HARQ-ACK to be transmitted,

1> if simultaneous transmission of the pCSI and HARQ-ACK on the PUCCH is configured on, the HARQ-ACK and pCSI is transmitted using PUCCH format 2.

2> if simultaneous transmission of the pCSI and HARQ-ACK on the PUCCH is configured off, the HARQ-ACK is transmitted using PUCCH format 1 and the pCSI is dropped.

B) if there is no HARQ-ACK to be transmitted, the pCSI is transmitted using PUCCH format 2.

(2) PUCCH format 3

(A) If aperiodic CSI is triggered, pCSI is dropped.

(B) If simultaneous transmission of PUCCH/PUSCH is configured on, 1) if there is HARQ-ACK to be transmitted, A) if simultaneous transmission of the pCSI and HARQ-ACK on the PUCCH is configured on, 1> if there is a scheduled PUSCH, the HARQ-ACK is transmitted in PUSCCH format 3 and the pCSI is transmitted on the PUSCH.

2> if there is no scheduled PUSCH, the HARQ-ACK and pCSI is transmitted using PUCCH format 3.

B) if simultaneous transmission of the pCSI and HARQ-ACK on the PUCCH is configured off, 1> if there is a scheduled PUSCH, the HARQ-ACK is transmitted using PUCCH format 3 and the pCSI is transmitted on the PUSCH.

2> if there is no scheduled PUSCH, the HARQ-ACK is transmitted using PUCCH format 3 and the pCSI is dropped.

2) if there is no HARQ-ACK to be transmitted, the pCSI is transmitted using PUCCH format 2.

(C) If simultaneous transmission of PUCCH/PUSCH is configured off, 1) if there is a scheduled PUSCH, the pCSI is transmitted on a PUSCH corresponding to a cell with the lowest SCell index (lowest SCellIndex cell).

2) if there is no scheduled PUSCH,

A) if there is HARQ-ACK to be transmitted,

1> if simultaneous transmission of the pCSI and HARQ-ACK on the PUCCH is configured on, the HARQ-ACK and pCSI is transmitted using PUCCH format 3.

2> if simultaneous transmission of the pCSI and HARQ-ACK on the PUCCH is configured off, the HARQ-ACK is transmitted using PUCCH format 3 and the pCSI is dropped.

B) if there is no HARQ-ACK to be transmitted, the pCSI is transmitted using PUCCH format 2.

(3) PUCCH format 4/5

(A) If aperiodic CSI is triggered, pCSI is dropped.

(B) If simultaneous transmission of PUCCH/PUSCH is configured on, 1) if there is HARQ-ACK to be transmitted, A) if simultaneous transmission of the pCSI and HARQ-ACK on the PUCCH is configured on, 1> if there is a scheduled PUSCH, the HARQ-ACK is transmitted using PUCCH format 4/5 and the pCSI is transmitted on the PUSCH.

2> if there is no scheduled PUSCH, the HARQ-ACK and pCSI is transmitted using PUCCH format 4/5.

B) if simultaneous transmission of the pCSI and HARQ-ACK on the PUCCH is configured off, 1> if there is a scheduled PUSCH, the HARQ-ACK is transmitted using PUCCH format 4/5 and the pCSI is transmitted on the PUSCH.

2> if there is no scheduled PUSCH, the HARQ-ACK is transmitted using PUCCH format 4/5 and the pCSI is dropped.

2) if there is no HARQ-ACK to be transmitted, the pCSI is transmitted using PUCCH format 2 or PUCCH format 4/5.

(C) If simultaneous transmission of PUCCH/PUSCH is configured off, 1) if there is a scheduled PUSCH, the pCSI is transmitted on a PUSCH corresponding to a cell with the lowest SCell index (lowest SCellIndex cell).

2) if there is no scheduled PUSCH,

A) if there is HARQ-ACK to be transmitted,

1> if simultaneous transmission of the pCSI and HARQ-ACK on the PUCCH is configured on, the HARQ-ACK and pCSI is transmitted using PUCCH format 4/5.

2> if simultaneous transmission of the pCSI and HARQ-ACK on the PUCCH is configured off, the HARQ-ACK is transmitted using PUCCH format 4/5 and the pCSI is dropped.

B) if there is no HARQ-ACK to be transmitted, the pCSI is transmitted using PUCCH format 2 or PUCCH format 4/5.

Additionally, the eLAA system in Release 14 considers supporting simultaneous transmission of a PUCCH in a licensed band (or licensed carrier) and a PUSCH in an unlicensed band (or LAA SCell) at all times for UL transmission at a UE. Considering the simultaneous transmission, if a UE is configured to transmit HARQ-ACK and pCSI in a specific subframe and an unlicensed band (e.g., LAA SCell) PUSCH is scheduled in the specific subframe in a CA environment including an unlicensed band (e.g., LAA SCell), the UE, which operates according to the legacy LTE system, may transmit the pCSI on a PUSCH in a cell with the lowest Scell index among scheduled PUSCHs other than the following exceptional case.

(Exceptional case) When HARQ-ACK transmission is performed using PUCCH format 4/5, if simultaneous transmission of PUCCH/PUSCH is configured and simultaneous transmission of HARQ-ACK and CSI is also configured or activated (that is, if the value of a parameter named simultaneousAckNackAndCQI-Format4-Format5-r13 is set to 'TRUE'), a UE transmits pCSI on a PUCCH rather than a PUSCH.

<pCSI Transmission Methods for a UE According to the Present Invention>

The present invention does not consider the above exceptional case. This is because since in the exceptional case, pCSI is transmitted on a PUCCH rather than a PUSCH, a UE can transmit the pCSI on a PUCCH in a licensed band if the exceptional case is applied. In other words, the present invention proposes a particular method for transmitting pCSI on a PUSCH in a CA environment including LAA SCells, and thus in the exceptional case where pCSI is transmitted on a PUCCH rather than a PUSCH, a UE can operate in the same way as in the legacy LTE system.

Hereinafter, methods in which a UE transmits pCSI in a specific subframe when the UE needs to perform HARQ-ACK transmission and pCSI reporting in the specific subframe in a CA environment including LAA SCells will be described in detail.

3.1.1. First pCSI Transmission Method

According to the present invention, when PUSCHs are scheduled in licensed bands (or licensed carriers) and LAA SCells, a UE may be configured to transmit HARQ-ACK and pCSI first on a licensed band (or licensed carrier) PUSCH. That is, the UE may transmit the HARQ-ACK and pCSI through a PUSCH in a cell with the lowest SCell index among the licensed bands (or licensed carriers) except the LAA SCells. By doing so, it is possible to eliminate the uncertainty of pCSI transmission, which results from the characteristics of an LAA SCell where PUSCH transmission is allowed only when a UE successfully completes Listen Before Talk (LBT).

However, when only LAA SCell PUSCHs are allocated without scheduling licensed band (or licensed carrier) PUSCHs (a first case) or when a cell with the lowest SCell index is an LAA SCell (unlike the above case) although PUSCHs are scheduled in licensed bands (or licensed carriers) and LAA SCells (a second case), pCSI transmission methods can be determined as follows. In addition, a different pCSI transmission method can be applied to each case.

3.1.2. Second pCSI Transmission Method

A UE drops pCSI transmission. In other words, in one of the above cases, the UE may drop the pCSI transmission.

3.1.3. Third pCSI Transmission Method

A UE attempt to transmit pCSI on the assumption that no PUSCH is allocated. For example, when a UE transmits HARQ-ACK using PUCCH format 4/5 (if simultaneous transmission of PUCCH/PUSCH is configured and the value of the parameter named simultaneousAckNackAndCQI-Format4-Format5-r13 is set to 'TRUE'), the UE may transmit the HARQ-ACK together with pCSI using PUCCH format 4/5 as if there is no scheduled PUSCH. And, the UE may transmit a UL-SCH only without UCI piggyback on an LAA SCell using a PUSCH. As another example, when a UE transmits HARQ-ACK using PUCCH format 4/5 (if simultaneous transmission of PUCCH/PUSCH is configured and the value of the parameter named simultaneousAckNackAndCQI-Format4-Format5-r13 is set to 'FALSE'), the UE may transmit the HARQ-ACK using PUCCH format 4/5 and drop pCSI transmission as if there is no scheduled PUSCH. And, the UE may transmit a UL-SCH only without UCI piggyback on an LAA SCell using a PUSCH.

3.1.4. Fourth pCSI Transmission Method

A UE may perform pCSI transmission on an LAA SCell. For example, pCSI may be configured to be transmitted only in a cell with the lowest SCell index. In this case, if the UE fails LBT for the corresponding cell, the UE should drop the pCSI transmission. To compensate for the pCSI transmission drop, which occurs when the UE fails LBT, the UE may perform HARQ-ACK and pCSI transmission on PUSCHs in all available LAA SCells.

In addition, the UE may transmit the pCSI on a cell with the lowest SCell index among LAA SCells where there is ongoing transmission. Moreover, the UE may attempt the pCSI transmission on not only the cell with the lowest SCell index but N LAA SCells selected in ascending index order.

3.2. Aperiodic CSI (aCSI) Transmission without UL-SCH

Before describing aCSI transmission methods according to the present invention, the methods of performing aCSI transmission with no UL-SCH defined in the legacy LTE system will be described.

In the legacy LTE system, if a UE receives a UL grant satisfying the following conditions, the UE may transmit a PUSCH including only a UL control indicator (e.g., UCI, HARQ-ACK, CQI, PMI, RI, etc.) without a UL-SCH.

(1) A case in which DCI format 0 is used and I_mcs=29 or a case in which DCI format 4 is used, I_mcs=29, and only one Transmission Block (TB) is enabled.

The condition that DCI format 4 is used and only one TB is enabled may satisfy either {I_mcs=0 and N_prb>1} or {I_mcs=28 and N_prb=1}. In this case, I_mcs indicates a Modulation and Coding Scheme (MCS) index and may have a value in the range of 0 to 31. N_prb indicates the number of Physical Resource Blocks (PRBs) where one or two TBs are scheduled.

If 2-TB transmission is scheduled, I_mcs may be indicated for each TB, and common N_prb may be indicated for all TBs. In this case, if the condition of {I_mcs=0 and N_prb>1} is satisfied, the indicated modulation orders and coding rates are not suitable for the 2-TB transmission so that it could be interpreted to mean that only one TB is enabled. In addition, if the condition of {I_mcs=28 and N_prb=1} is satisfied, the indicated modulation orders and coding rates have extremely high values and only a single RB is scheduled so that it could be interpreted to mean that only one TB is enabled due to a small amount of available information.

In DL, the condition for disabling one TB is that I_mcs=0 and Redundancy Version (RV)=1.

(2) A case in which aCSI reporting is triggered by the "CSI request" bit field (3) If there is only one serving cell, the condition of N_prb<4 should be met. If a serving cell is configured with CA composed of two to five CCs, the condition of N_prb<20 should be met. However, if a serving is configured with CA composed of five or more CCs, aCSI transmission is possible without any UL-SCHs regardless of the value of N_prb.

Meanwhile, in the LAA system to which the present invention is applicable, the following matters are introduced or modified compared to the legacy LTE system. Thus, the conditions for a UL grant that triggers transmission of a PUSCH including only CSI with no UL-SCH may be modified in the LAA system according to the present invention.

1> Asynchronous HARQ is introduced in UL transmission, and an RV value is separately signaled. Thus, I_mcs=29/30/31, which respectively represented RV=1/2/3 in the legacy system, may be modified to respectively represent modulation order 2/4/6 for retransmission in the LAA system to which the present invention is applicable, similar to that in DL.

2> New DCI format 0A/0B/4A/4B is defined for the LAA system to which the present invention is applicable. Specifically, DCI format 0A/4A is to schedule a single subframe, and more particularly, DCI format 0A is used for 1-TB transmission and DCI format 4A is used for 2-TB transmission. In addition, DCI format 0B/4B is to schedule multiple subframes, and more particularly, DCI format 0B is used for 1-TB transmission and DCI format 4B is used for 2-TB transmission. In this case, the maximum number of subframes that can be scheduled by DCI format 0B/4B is configurable, and the maximum number of subframes may be set to one of 2, 3, and 4. Moreover, DCI format 0B/4B may also be used to schedule only a single subframe.

In particular, the "RV" bit field of DCI format 0A/4A may be composed of 2/4 bit. Using DCI format 0A/4A, an eNB may signal four RV values per TB.

In addition, the "RV" bit field of DCI format 0B/4B may be composed of bits corresponding to the maximum number of schedulable subframes. In this case, each RV value may be commonly applied to TBs, and the RV value may be set to 0 or 2. For example, if the maximum number of subframes that can be scheduled by DCI format 4B is 3, the "RV" bit field of DCI format 4B is composed of 3 bits. Each bit indicates that the RV is 0 or 2 for a subframe mapped to each bit, and two TBs share the same RV value.

3> In the LAA system to which the present invention is applicable, PUSCH resource allocation may be performed on an interlace basis. In this case, one interlace may be composed of 10 RBs which are equally distributed. Specifically, the one interlace may be composed of 10 RBs spaced at intervals of 10 RBs. Thus, the minimum unit of N_prb is 10, and the PUSCH resource allocation may be performed using a multiple of 10.

4> When aCSI reporting is triggered by the "CSI request" bit field of DCI format 0B/4B, aCSI may be reported in the last subframe if the number of scheduled subframes is equal to or less than 2, and the aCSI may be reported in the second last subframe if the number of scheduled subframes is equal to or more than 3.

Since the LAA system to which the present invention is applicable is quite different from the legacy LTE system as described above, the present invention proposes the following conditions as the conditions for a UL grant triggering transmission of a PUSCH including only CSI with no UL-SCH by considering the differences therebetween. In this case, the PUSCH including only CSI with no UL-SCH may be transmitted when some or all of the following conditions are satisfied.

3.2.1. First Condition

The first condition may be that in the case of using DCI format 4A/4B, which is the DCI format for 2-TB transmission, only one TB is enabled. To this end, the condition of I_mcs=0 may be applied.

In this case, in the case of using DCI format 4A, I_mcs=0 and RV=1 (as an additional condition) may be applied to satisfy the condition that only one TB is enabled.

Alternatively, the following TB disabling methods may be applied to enable only one TB. In this case, one or any combination of the following methods may be applied in order to disable one TB.

1) Considering that the minimum unit of N_prb is 10 regarding the PUSCH resource allocation in the LAA system to which the present invention is applicable, one TB may be disabled if either {I_mcs=0 and N_prb>10} or {I_mcs=28 and N_prb=10} is satisfied.

Additionally, an RV condition may be considered as the condition for disabling one TB. For example, in addition to condition 1), if an RV value is set to 1 in the case of using DCI format 4A or if an RV value is set to 2 in the case of using DCI format 4B, one TB may be disabled. Alternatively, the RV condition may be commonly configured for DCI format 4A/4B (for example, RV value=2).

2) Similar to the legacy LTE system, if I_mcs=0 and the RV condition is met, one TB may be disabled.

In this case, the RV condition may depend on whether the DCI format is either DCI format 4A or DCI format 4B. For example, when DCI format 4A is used, the RV condition may be satisfied if the RV value is 1, and when DCI format 4B is used, the RV condition may be satisfied if the RV value is 2. As another example, the RV condition may be commonly configured for DCI format 4A/4B (for example, RV value=2).

3) A new 1-bit indicator indicating that one TB is disabled may be introduced. Alternatively, among the fields included in a UL grant, reserved bits may be used to disable one TB.

3.2.2. Second Condition

The second condition may be that an I_mcs parameter value is set to one of {29, 30, 31}.

For example, among I_mcs parameter values used for retransmission, the I_mcs parameter value corresponding to modulation order 6 (for example, 31) may be used as the second condition. This is because the probability of instructing transmission with modulation order 6 is relatively low.

3.2.3. Third Condition

The third condition may be established such that the corresponding condition is regardless of the value of N_prb. Alternatively, the third condition may be established such that only when the number of CSI processes is more than 5, it is regardless of the value of N_prb but otherwise, the condition of N_prb=10 or N_prb<=10 (or the condition that only a single interlace is allocated) is applied.

3.2.4. Fourth Condition

As the fourth condition, constraint conditions depending on the number of scheduled subframes may be applied. This is because scheduling a PUSCH with no UL-SCH in multiple consecutive subframes is not desirable in terms of system implementation. Hereinafter, the constraint conditions corresponding to the fourth condition will be described in detail.

(1) Only DCI format 0A/4A can be used. More specifically, when DCI format 0B/4B is used, transmission of a PUSCH including only CSI with no UL-SCH may not be allowed.

(2) DCI format 0B (and/or DCI format 4B) as well as DCI format 0A/4A can be used. However, when DCI format 0B (and/or DCI format 4B) is used, only one subframe should be scheduled. That is, when only one subframe is scheduled by DCI format 0B/4B, transmission of a PUSCH including only CSI with no UL-SCH may be allowed.

(3) DCI format 0B (and/or DCI format 4B) as well as DCI format 0A/4A can be used. However, when DCI format 0B (and/or DCI format 4B) is used, the number of actually scheduled subframes should be less than the maximum number of schedulable subframes. In this case, transmission of a PUSCH including only CSI with no UL-SCH is performed on a subframe next to the actually scheduled subframes (or a later subframe), and transmission of a PUSCH without aCSI may be performed on the actually scheduled subframes.

(4) DCI format 0B (and/or DCI format 4B) as well as DCI format 0A/4A can be used. However, similar to the existing aCSI transmission rule, when DCI format 0B (and/or DCI format 4B) is used, a PUSCH including only CSI with no UL-SCH is transmitted in the last subframe if the number of actually scheduled subframes is equal to or less than 2. On the contrary, if the number of actually scheduled subframes is equal to or more than 3, the PUSCH including only the CSI with no UL-SCH is transmitted in the second last subframe. In this case, that is, when the PUSCH including only the CSI with no UL-SCH is transmitted in the second last subframe, the HARQ process index of the last subframe may be configured by excluding or including the second last subframe. For example, if the number of scheduled subframes is 4 and the HARQ process index is set to 3, the HARQ process indices corresponding to the individual scheduled subframes are 3/4/5/6, respectively. In this case, when a PUSCH including only CSI with no UL-SCH is transmitted in the second last subframe, the HARQ process index of the last subframe may be set to 6 as it is or 5 by excluding the subframe where the transmission is performed with no UL-SCH.

(5) DCI format 0B (and/or DCI format 4B) as well as DCI format 0A/4A can be used. However, when DCI format 0B (and/or DCI format 4B) is used, a PUSCH including only CSI with no UL-SCH may be transmitted in the first or last (or a specific) subframe (SF) among scheduled subframe(s). If the PUSCH including only the CSI with no UL-SCH is transmitted in the first subframe among the scheduled subframe(s), the HARQ process index of the second subframe may be configured by excluding or including the first subframe.

For example, if the number of scheduled subframes is 4 and the HARQ process index is set to 3, the HARQ process indices corresponding to the individual scheduled subframes may be 3/4/5/6, respectively. In this case, when a PUSCH including only CSI with no UL-SCH is transmitted in the first subframe, the HARQ process index of the second subframe may be set to 4 as it is or 3 by excluding the subframe where the transmission is performed with no UL-SCH.

The fourth condition may vary depending on whether DCI format 0B or 4B is used. For example, in the case of using DCI format 0B, the fourth condition may be applied as described in (3) or (4). In the case of using DCI format 4B, the fourth condition may be applied as described in (2).

3.2.5. Fifth Condition

The fifth condition may be that aCSI reporting is triggered by the "CSI request" bit field.

3.2.6. Sixth Condition

As the sixth condition, constraint conditions for RV values may be applied.

For example, in the case of using DCI format 0A/4A, the condition that an RV value is set to 1 or 2 (for common design with DCI format 0B/4B) may be applied as the sixth condition.

As another example, in the case of using DCI format 0B/4B, the condition that an RV value is set to 2 and/or some or all of the RV values corresponding to non-scheduled subframes are set to 2 may be applied as the sixth condition.

3.2.7. Seventh Condition

The seventh condition may be the combination of the above-described fourth and sixth conditions. The seventh condition may be applied to multi-subframe DCI, that is, when DCI format 0B/4B is used.

(1) If the condition described in (5) of the fourth condition is satisfied, a PUSCH including only CSI with no UL-SCH may be transmitted in the first or last (or a specific) subframe among scheduled subframe(s). Particularly, a rule may be configured as follows: if the number of actually scheduled subframes is less than 3, the aCSI is transmitted in the last subframe, and if the number of actually scheduled subframes is equal to or more than 3, the aCSI is transmitted in the second last subframe.

In this case, a rule may be configured as follows: if the RV value for the subframe where the PUSCH including only the aCSI with no UL-SCH is to be transmitted satisfies the above-described sixth condition (as well as some or all of the first, second, third, and fifth conditions), the PUSCH including only the aCSI with no UL-SCH is transmitted in the corresponding subframe.

(2) A rule may be configured as follows: a PUSCH including only aCSI with no UL-SCH is transmitted in a subframe(s) that satisfies the sixth condition (as well as some or all of the first, second, third, and fifth conditions). In this case, to improve the inefficiency that multiple subframes are used to report the same aCSI, a set of CCs for the aCSI transmission may vary per scheduled subframe. For example, the "CSI reporting" bit field may be allocated differently depending on the number of scheduled subframes (or the maximum number of scheduled subframes).

Specifically, when the size of the "CSI reporting" bit field is 2 bits, if the number of scheduled subframes (or the maximum number of scheduled subframes) is 3, the "CSI reporting" bit field may be composed of a total of 6 bits. In this case, aCSI corresponding to a set of CCs indicated by the "CSI reporting" bit field, which correspond to the location of each subframe, may be transmitted in a subframe(s) that satisfies the sixth condition (as well as some or all of the first, second, third, and fifth conditions).

As another example, the bit-width of the "CSI reporting" bit field may be constant, but a set of CCs corresponding to aCSI transmission may vary per scheduled subframe according to a predetermined rule. Specifically, a rule may be configured as follows: if '10' is signaled by the "CSI reporting" bit field and there are multiple subframes satisfying the sixth condition (as well as some or all of the first, second, third, and fifth conditions), '10' is applied to the first subframe, '11' is applied to the second subframe, and '01' is applied to the third subframe.

(3) A rule may be configured as follows: a PUSCH including only aCSI with no UL-SCH is transmitted in a subframe(s) that satisfies the sixth condition (as well as some or all of the first, second, third, and fifth conditions). In this case, if there are multiple subframes satisfying the corresponding conditions, the PUSCH including only the aCSI with no UL-SCH may be transmitted in one specific subframe among the subframes. For example, the corresponding specific subframe may be set to the first or last subframe among the subframes that satisfy the sixth condition (as well as some or all of the first, second, third, and fifth conditions).

3.3. aCSI and pCSI Transmission Methods

In this section, how a UE configured to perform UL transmission on an LAA SCell performs pCSI and/or aCSI transmission if the pCSI transmission collides with the aCSI transmission on the same subframe will be described.

In particular, the present invention describes pCSI and/or aCSI transmission methods when pCSI transmission on an L-cell is configured and aCSI transmission on a U-cell is triggered. In the legacy LTE system, when pCSI and aCSI transmission collides to each other on the same subframe, a UE drops the pCSI transmission and performs the aCSI transmission only.

3.3.1 First aCSI and pCSI Transmission Method

A UE determines whether to perform transmission on a U-cell according to its LBT result. Therefore, if the UE drops pCSI transmission and fails LBT in a corresponding subframe, the UE may not attempt not only the pCSI transmission but aCSI transmission. To prevent the occurrence of this situation, the present invention proposes a method for allowing pCSI transmission on an L-cell and aCSI transmission on a U-cell at the same time. In other words, if a UE succeeds LBT on a U-cell where aCSI transmission is triggered, the UE may perform pCSI transmission on an L-cell and the aCSI transmission on the U-cell. On the other hand, if the UE fails the LBT on the U-cell where the aCSI transmission is triggered, the UE may only perform the pCSI transmission on the L-cell.

3.3.2. Second aCSI and pCSI Transmission Method

As an extreme example, when a UE performs aCSI and pCSI transmission according to the above-described first aCSI and pCSI transmission method, the UE may redundantly report pCSI and aCSI using CSI on the same serving cell. Considering that this operation not only corresponds to new UE behavior, which is not defined in the legacy LTE system, but transmits the same CSI, it may not be desirable.

Thus, if a cell for pCSI reporting is equivalent to a cell(s) for aCSI reporting (or if these cells overlap each other or are in a mutual inclusion relation), the UE may be configured to drop the pCSI transmission. In other words, if the cell for pCSI reporting is not equivalent to the cell(s) for aCSI reporting (or if these cells do not overlap), the aforementioned first aCSI and pCSI transmission method may be applied.

The second aCSI and pCSI transmission method can be applied even when simultaneous transmission of pCSI on a random cell and aCSI on another cell is allowed in the same subframe, regardless of cell types (e.g., L-cell, U-cell, etc.).

3.3.3. Third aCSI and pCSI Transmission Method

When a UE performs aCSI and pCSI transmission according to the above-described first aCSI and pCSI transmission method, the total number of CSI processes that the UE should report may exceed the maximum number of CSI processes where the UE can perform CSI update (or CSI measurement) (for example, 5 CSI processes in case CA is composed of 5 CCs or less and a value reported by UE capability signaling in case CA is composed of more than 5 CCs). To overcome this problem, the third aCSI and pCSI transmission method proposes to drop the pCSI transmission in the above situation.

In other words, if the total number of CSI processes that should be reported does not exceed the maximum number of CSI processes where a UE can perform CSI update (or CSI measurement) (for example, 5 CSI processes in case CA is composed of 5 CCs or less and a value reported by UE capability signaling in case CA is composed of more than 5 CCs), the UE may perform aCSI and pCSI transmission according to the above-described first aCSI and pCSI transmission method.

The corresponding method can be applied when simultaneous transmission of pCSI on a random cell and aCSI on another cell is allowed in the same subframe, regardless of cell types (e.g., L-cell, U-cell, etc.).

The aforementioned first to third aCSI and pCSI transmission methods can be applied to the dual connectivity situation (when a PUCCH cell group is configured or when the stand-alone operation where only a U-cell is used without assistance from an L-cell is supported). For example, in the case of a Secondary Cell Group (SCG) consisting of only U-cells (or PUCCH Cell Group (CG)), if pCSI transmission collides with aCSI transmission in the same subframe, a UE may simultaneously perform pCSI and aCSI transmission according to the first aCSI and pCSI transmission method. In other words, in this case, the UE may be allowed to simultaneously perform the pCSI and aCSI transmission according to the first aCSI and pCSI transmission method of the present invention.

Since each of the examples of the proposed methods can be considered as one method for implementing the present invention, it is apparent that each example can be regarded as a proposed method. In addition, it is possible to implement the proposed methods not only independently but by combining (or merging) some of the proposed methods. Moreover, a rule may be defined such that information on whether the proposed methods are applied (or information on rules related to the proposed methods) should be transmitted from a BS to a UE through a predefined signal (e.g., physical layer signal, higher layer signal, etc.).

As described above, the present invention provides methods in which a UE reports CSI using an unlicensed band in a wireless communication system supporting the unlicensed band.

Due to the nature of the unlicensed band, the UE may receive a UL grant being composed of a DCI format (e.g., DCI format 0B/4B) capable of scheduling UL transmission in at least one subframe in the unlicensed band.

In this case, the UL grant may include a CSI request bit configured to trigger aCSI reporting and an MCS field set to a specific value (e.g., 29).

Upon receiving the UL grant, the UE may transmit a UL signal (e.g., PUSCH) in the at least one subframe indicated by the UL grant on the unlicensed band. In particular, the UE may perform LBT for the transmission on the unlicensed band, and based on the LBT result, the UE may transmit the UL signal in the at least one subframe scheduled by the UL grant.

In this case, if the UL grant triggers the aCSI reporting by scheduling UL transmission in a single subframe even though it can schedule a plurality of subframes, the UE can transmit the CSI on a PUSCH without UL-SCH to a BS. In other words, the UE may transmit the PUSCH including only the CSI without UL-SCH if specific conditions are satisfied.

Therefore, according to the present invention, when the aCSI reporting is triggered and the specific conditions are satisfied, the UE can report the CSI to the BS more efficiently

4. Device Configuration

Figure 14:
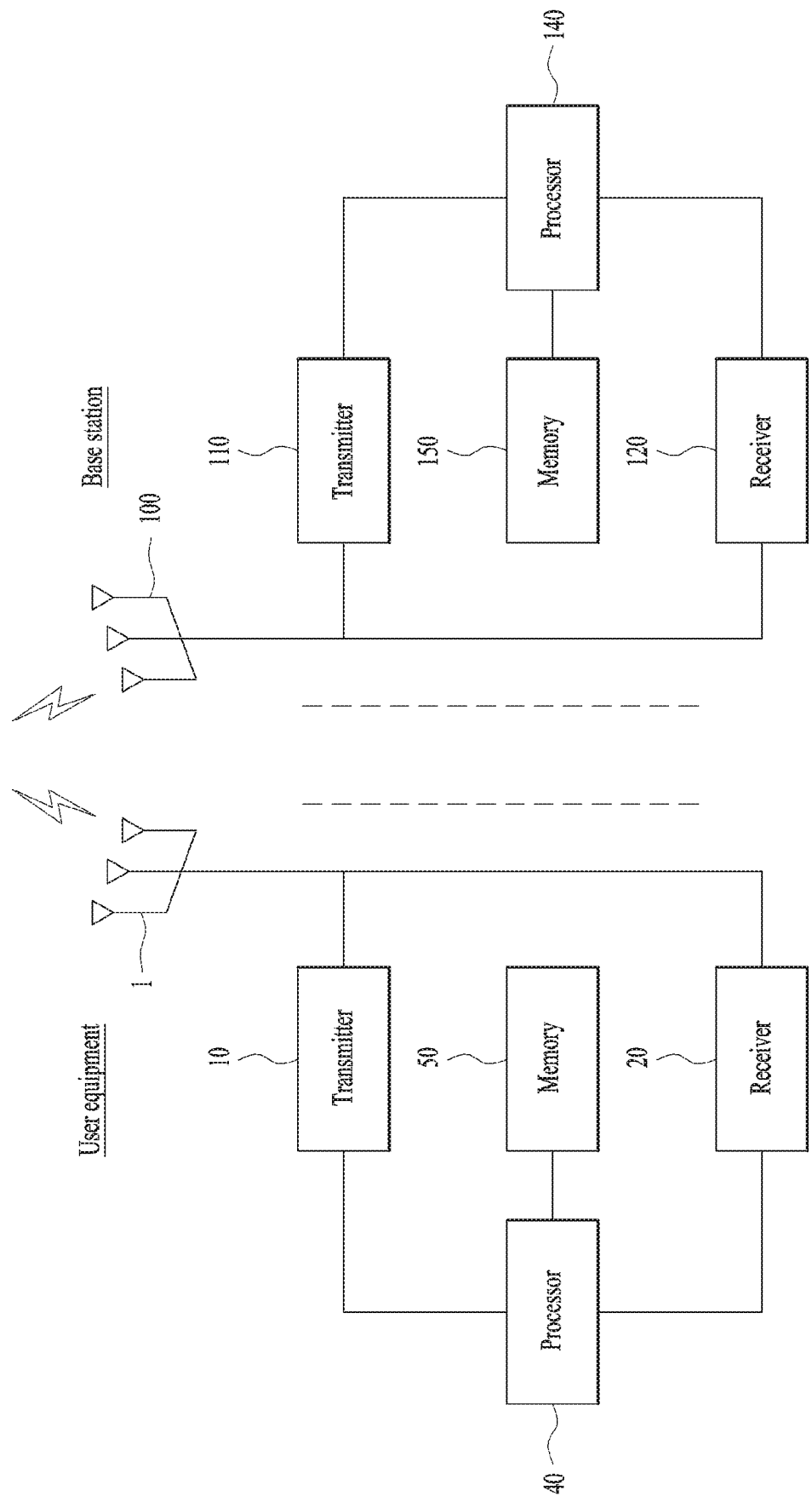
FIG. 14 is a diagram illustrating configuration of a user equipment and a base station for implementing the proposed embodiments

FIG. 14 is a diagram illustrating configurations of a UE and a base station capable of being implemented by the embodiments proposed in the present invention. The UE shown in FIG. 14 operates to implement the embodiments of the aforementioned CSI reporting methods A UE 1 may act as a transmission end on a UL and as a reception end on a DL. A base station (eNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

With the above-described configuration, the UE 1 may be configured to receive a UL grant being composed of a DCI format capable of scheduling UL transmission in at least one subframe in an unlicensed band through the receiver 20 and transmit a PUSCH including CSI without UL-SCH through the transmitter 20 only when the UL grant schedules UL transmission in one subframe. In this case, the PUSCH including the CSI without UL-SCH is transmitted in the unlicensed band, and to this end, the UE may perform Listen Before Talk (LBT) operation to transmit the PUSCH including the CSI with no UL-SCH in the unlicensed band.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 14 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 180 or 190 and executed by the processor 120 or 130. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The embodiments of the present invention can be applied to various wireless access systems including 3GPP (3rd Generation Partnership Project) and 3GPP2 system. The embodiments of the present invention can be applied not only to various wireless access systems but also to all technical fields to which the various wireless access systems are applied. Further, the proposed method can also be applied to an mmWave communication system using ultra-high frequency band.

What is claimed is:

1. A method for operating a User Equipment (UE) in a wireless communication system, the wireless communication system including a base station (BS) and supporting communications in an unlicensed band, the method performed by the UE and comprising:
   receiving, from the BS, downlink control information (DCI) for scheduling an uplink transmission in the unlicensed band,
   wherein the DCI includes information for scheduling a transmission of a Physical Uplink Shared Channel (PUSCH) that includes aperiodic channel state information (CSI);
   based on the DCI, transmitting the PUSCH to the BS,
   wherein the PUSCH only includes the aperiodic CSI, and is transmitted in a single subframe, based on:
   a value of a Modulation and Coding Scheme (MCS) field included in the DCI,
   a CSI request bit included in the DCI, and
   a number of subframes to be used for the PUSCH being set to 1,
   wherein the number of subframes to be used for the PUSCH is set to 1, based on (i) the DCI corresponding to a first DCI format being used for scheduling of PUSCH in up to N subframes, where N is an integer larger than 1, and (ii) the DCI including information on the number of scheduled subframes being set to 1,
   wherein the MCS field value is 29.

2. The method of claim 1, wherein the first DCI format comprises DCI format 0B or DCI format 4B.

3. The method of claim 1, wherein a value of N is 4.

4. The method of claim 1, wherein the number of subframes to be used for the PUSCH is set to 1, based on the DCI corresponding to a second DCI format used for scheduling of the PUSCH in a single subframe.

5. The method of claim 4, wherein the second DCI format comprises DCI format 0A or DCI format 4A.

6. A User Equipment (UE) for operating in a wireless communication system, the wireless communication system including a base station (BS) and supporting communications in an unlicensed band, the UE comprising:
   a memory;
   a transceiver; and
   a processor operatively connected to the memory and the transceiver, the processor for:
   receiving, from the BS, downlink control information (DCI) for scheduling an uplink transmission in the unlicensed band,
   wherein the DCI includes information for scheduling a transmission of a Physical Uplink Shared Channel (PUSCH) that includes aperiodic channel state information (CSI);
   based on the DCI, transmitting the PUSCH to the BS,
   wherein the PUSCH only includes the aperiodic CSI, and is transmitted in a single subframe, based on:
   a value of a Modulation and Coding Scheme (MCS) field included in the DCI,
   a CSI request bit included in the DCI, and
   a number of subframes to be used for the PUSCH being set to 1,
   wherein the number of subframes to be used for the PUSCH is set to 1, based on (i) the DCI corresponding to a first DCI format being used for scheduling of PUSCH in up to N subframes, where N is an integer larger than 1, and (ii) the DCI including information on the number of scheduled subframes being set to 1,
   wherein the MCS field value is 29.

7. The UE of claim 6, wherein the first DCI format comprises DCI format 0B or DCI format 4B.

8. The UE of claim 6, wherein a value of N is 4.

9. The UE of claim 6, wherein the number of subframes to be used for the PUSCH is set to 1, based on the DCI corresponding to a second DCI format used for scheduling of the PUSCH in a single subframe.

10. The UE of claim 9, wherein the second DCI format comprises DCI format 0A or DCI format 4A.

11. A base station (BS) for operating in a wireless communication system, the wireless communication system including a User Equipment (UE) and supporting communications in an unlicensed band, the BS comprising:
    a memory;
    a transceiver; and
    a processor operatively connected to the memory and the transceiver, the processor for:
    transmitting, to the UE, downlink control information (DCI) for scheduling an uplink transmission in the unlicensed band,
    wherein the DCI includes information for scheduling a transmission of a Physical Uplink Shared Channel (PUSCH) that includes aperiodic channel state information (CSI);
    based on the DCI, receiving the PUSCH from the UE,
    wherein the PUSCH only includes the aperiodic CSI, and is transmitted in a single subframe, based on:
    a value of a Modulation and Coding Scheme (MCS) field included in the DCI,
    a CSI request bit included in the DCI, and
    a number of subframes to be used for the PUSCH being set to 1,
    wherein the number of subframes to be used for the PUSCH is set to 1, based on (i) the DCI corresponding to a first DCI format being used for scheduling of PUSCH in up to N subframes, where N is an integer larger than 1, and (ii) the DCI including information on the number of scheduled subframes being set to 1,
    wherein the MCS field value is 29.

12. The base station of claim 11, wherein the first DCI format comprises DCI format 0B or DCI format 4B.

13. The base station of claim 11, wherein a value of N is 4.

14. The base station of claim 11, wherein the number of subframes to be used for the PUSCH is set to 1, based on the DCI corresponding to a second DCI format used for scheduling of the PUSCH in a single subframe.

15. The base station of claim 14, wherein the second DCI format comprises DCI format 0A or DCI format 4A.

\* \* \* \* \*